US006999221B1

(12) United States Patent
Sarkisov et al.

(10) Patent No.: US 6,999,221 B1
(45) Date of Patent: Feb. 14, 2006

(54) BIMORPHIC POLYMERIC PHOTOMECHANICAL ACTUATOR

(75) Inventors: Sergey S. Sarkisov, Huntsville, AL (US); Michael J. Curley, Huntsville, AL (US); Grigory Adamovsky, Solon, OH (US); Sergey S. Sarkisov, Jr., Huntsville, AL (US); Aisha B. Fields, Huntsville, AL (US)

(73) Assignees: Alabama A&M University, Normal, AL (US); The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 47 days.

(21) Appl. No.: 10/714,702

(22) Filed: Nov. 17, 2003

(51) Int. Cl.
G02F 1/03 (2006.01)
G02F 1/295 (2006.01)
G02B 26/00 (2006.01)
H04B 10/04 (2006.01)
B32B 27/00 (2006.01)

(52) U.S. Cl. ............... 359/244; 359/246; 359/264; 359/224; 359/291; 359/323; 359/847; 398/189; 398/191; 398/140; 398/130; 428/421; 385/4; 385/15; 385/16; 310/330; 310/309; 310/360; 136/246; 250/306

(58) Field of Classification Search ........... 359/244, 359/246, 264, 238, 224, 291, 315, 323, 847; 385/4, 9, 15, 16; 428/421, 910; 398/189, 398/191, 130, 140; 310/309, 330, 360; 136/246; 250/306; 430/254, 272.1, 531

See application file for complete search history.

(56) References Cited

U.S. PATENT DOCUMENTS

| 2,341,877 | A | * | 2/1944 | Middleton et al. ........... 430/531 |
| 3,091,707 | A | * | 5/1963 | Hutson ....................... 310/360 |
| 3,677,763 | A | * | 7/1972 | De Boer et al. .......... 430/272.1 |
| 3,690,882 | A | * | 9/1972 | Przezdziecki ............... 430/254 |
| 4,385,798 | A | * | 5/1983 | Yevick ........................ 385/4 |
| 4,733,561 | A | | 3/1988 | Gilby .......................... 73/579 |
| 4,802,153 | A | | 1/1989 | Kataoka et al. .......... 369/44.12 |
| 4,952,787 | A | | 8/1990 | Nakamura et al. ....... 250/201.5 |
| 4,969,137 | A | | 11/1990 | Sugiyama et al. ....... 369/44.11 |
| 5,050,969 | A | | 9/1991 | Uchino et al. .............. 359/246 |
| 5,095,515 | A | | 3/1992 | Seaver ........................ 385/16 |
| 5,107,114 | A | * | 4/1992 | Nishioka et al. ........... 250/306 |
| 5,202,790 | A | | 4/1993 | Uchino et al. .............. 359/323 |
| 5,270,987 | A | | 12/1993 | Kaku et al. .............. 369/13.02 |
| 5,383,048 | A | | 1/1995 | Seaver ....................... 359/279 |

(Continued)

OTHER PUBLICATIONS

Acoustic Transduction Materials and Devices, Jan. 1999 to Dec. 1999, Annual Report vol. III, Office of Naval Research, Contract No. N00014-96-1-1173, Uchino.

(Continued)

*Primary Examiner*—Loha Ben
(74) *Attorney, Agent, or Firm*—Waddey & Patterson, P.C.; Howard H. Bayless; Larry W. Brantley

(57) ABSTRACT

A bimorphic polymeric photomechanical actuator, in one embodiment using polyvinylidene fluoride (PVDF) as a photosensitive body, transmitting light over fiber optic cables, and controlling the shape and pulse duration of the light pulse to control movement of the actuator. Multiple light beams are utilized to generate different ranges of motion for the actuator from a single photomechanical body and alternative designs use multiple light beams and multiple photomechanical bodies to provide controlled movement. Actuator movement using one or more ranges of motion is utilized to control motion to position an actuating element in three dimensional space.

83 Claims, 8 Drawing Sheets

U.S. PATENT DOCUMENTS

| | | | | |
|---|---|---|---|---|
| 5,502,781 | A | 3/1996 | Li et al. .......................... | 385/4 |
| 5,585,961 | A | 12/1996 | Saitoh et al. ................ | 359/323 |
| 5,687,155 | A | 11/1997 | Fukakusa et al. ...... | 369/112.06 |
| 5,757,758 | A | 5/1998 | Yagi et al. ............. | 369/112.25 |
| 5,774,259 | A | 6/1998 | Saitoh et al. ................ | 359/315 |
| 5,903,380 | A * | 5/1999 | Motamedi et al. .......... | 359/224 |
| 6,014,477 | A | 1/2000 | Barber et al. .................. | 385/16 |
| 6,095,351 | A | 8/2000 | Rossler ................... | 213/75 TC |
| 6,125,087 | A | 9/2000 | Ohnishi et al. .......... | 369/44.23 |
| 6,152,181 | A | 11/2000 | Wapner et al. .............. | 137/807 |
| 6,297,579 | B1 * | 10/2001 | Martin et al. ................ | 310/330 |
| 6,342,671 | B1 | 1/2002 | Morikawa et al. .......... | 136/246 |
| 6,392,777 | B1 | 5/2002 | Elliott et al. ................. | 359/244 |
| 6,423,412 | B1 * | 7/2002 | Zhang et al. ................ | 428/421 |
| 6,513,939 | B1 * | 2/2003 | Fettig et al. ................. | 359/847 |

OTHER PUBLICATIONS

Recent Topics of Ceramic Actuators—How to Develop New Ceramic Devices, Ferroelectrics, 1989, vol. 91, pp. 281-292, Uchino.

All-optical devices in polymer optical fiber, Chemical Physics 245 (1999) 533-544, Kuzyk, et al.

* cited by examiner

BIMORPHIC POLYMERIC PHOTOMECHANICAL ACTUATOR

BACKGROUND OF THE INVENTION

The present invention relates generally to the conversion of the photonic energy of light into mechanical work in the form of dynamic motion of a mechanical structure. More particularly, this invention pertains to an apparatus and methods for generating rectilinear, curvilinear, or rotational movement of a mechanical structure by controlling the illumination of a light directed upon a new type of photosensitive body having photomechanical characteristics. Even more particularly, this invention pertains to a bimorphic polymeric photomechanical apparatus and method for converting light into movement.

Progress in the development of optic fiber technology and compact laser light sources has brought to life a great variety of optical sensors for almost every trade. Fiber optic based sensors have been incorporated into "smart" materials and structures, such as "smart skins", etc. Polymeric "smart skin" materials provide the useful structural properties characteristic of polymers while permitting exploitation of the electronic and photonic properties of miniaturized optical sensor systems. However, these systems lack simple and compact actuators that can be driven by the same low power light radiation used to operate the optical sensor systems. Current solutions employ electrically-driven actuators, which require voltage and current to be delivered by wires from an electric power source. The optical signal still must be converted into an electric current that can control the electrically-driven actuator. The fast growing industry of optical switching also experiences a similar problem. Currently available optical switches typically employ either electrically-driven piezoelectric actuator elements requiring external high voltage for actuation or converse piezoelectric driven actuator elements requiring a high power density light to cause actuation. These optical switches need either a relatively high power light source or external high voltage source to be applied to a switch.

The prior art is illustrated in the photo-driven actuator previously described by Uchino in "Recent topics of ceramic actuators. How to develop new ceramic devices", Ferroelectrics, Vol. 91,281–292 (1989). This prior art actuator is based on the photostrictive effect exhibited by piezoelectric lead lanthanum zirconate titanate (PLZT) ceramics in the presence of ultraviolet light. Shining ultraviolet light on a single PLZT body will not make the material move greatly. Instead, a complex arrangement of paired wafers is needed to magnify the displacement. Two very thin layers of PLZT are bonded together with opposing polarization directions and conducting material connecting the edges. Light shone on one wafer creates expansion and an electric field that goes through the conducting material and is applied on the second layer. The voltage triggers the piezoelectric effect in the second layer, which contracts, bending the entire double wafer. Unfortunately, when the illumination is shut off, it can take several minutes for the material to return to its original shape, so, in order to have any kind of quick response system, the second wafer must be illuminated to cause the shape change in the other direction.

The disadvantages of this and the other prior art are significant when designing a useful, low power photo-driven actuator or photo-driven fast acting switch. The body of the photosensitive material is made of solid piezoelectric PLZT ceramics and is hard to shape and mold. The PLZT actuator must be driven only by UV radiation, such as 380 nm and shorter wavelength, produced by high power high pressure arc lamps or UV lasers. UV radiation has significant attenuation losses when delivered through conventional optic fibers. The response of the PLZT actuator is very slow (several seconds). The maximum mechanical displacement generated by PLZT ceramics in response to illumination by light is short since the ceramic is hard, brittle, and has low strain before it fractures. As a result of these factors, PLZT ceramics' conversion efficiency of light energy into mechanical work is low.

Thus, there is a great need for a simple, efficient, and compact actuator, which can be driven by low power light radiation in the visible or mid-infrared range delivered through conventional optic fibers. The actuator should be suitable for integration with optical sensors and optical actuators of the same or different type. What is needed, then, is a photomechanical actuator as described herein.

SUMMARY OF THE INVENTION

The present invention is directed towards bimorphic polymeric photomechanical apparatus and methods for converting light into movement. Embodiments of the invention and advantages are shown for causing movement of a bimorphic polymeric photomechanical body by illuminating the body with a light beam to produce a photomechanical deformation of the body. Embodiments of the invention and advantages are shown for using a pulsed light output on a reciprocating bimorphic polymeric photomechanical body to create repetitive movements. This reciprocating body is shown in one preferred embodiment as a polyvinylidene fluoride (PVDF). Further embodiments and advantages provide improved control by using multiple light sources to provide multiple ranges of movement, including using multiple bimorphic polymeric photomechanical bodies to provide different ranges of movement and including creating these multiple ranges of movement with a single bimorphic polymeric photomechanical body.

A further apparatus and method with particular utility is provided in a low power optically controlled optical switch that allows both the control signal and the transferred through signal to be an optical signal.

Methods of the present invention include a method of generating repetitive movement in bimorphic polymeric photomechanical bodies with light, a method for controlling movements in bimorphic polymeric photomechanical bodies by controlling the light illumination frequency and pattern, and a method for controlling movements in bimorphic polymeric photomechanical bodies with light by illuminating multiple areas of a single bimorphic polymeric photomechanical bodies or by illuminating multiple bimorphic polymeric photomechanical bodies areas.

Other objects and further scope of the applicability of the present invention will become apparent from the detailed description to follow, taken in conjunction with the accompanying drawing, wherein like parts are designated by like reference numerals.

DESCRIPTION OF THE PREFERRED EMBODIMENTS

The present invention is directed to an apparatus and method that converts light into mechanical work by illuminating a photosensitive portion of a flexible photomechanical body to produce mechanical deformation of the body. A photomechanical body comprises a photomechanical material, which is herein defined as a photosensitive material that exhibits a photomechanical effect when illuminated. A photomechanical effect is herein defined as a bulk dimensional change in a photosensitive body induced by the influence of an applied field of light energy, such as a beam of light. Various embodiments of the present invention utilize this mechanical deformation of a photomechanical body to convert light energy into mechanical work. A description of a prototypical embodiment of the present invention illustrates the several mechanisms by which light interacts with photosensitive materials to produce a photomechanical effect within a photosensitive material.

Figure 1:
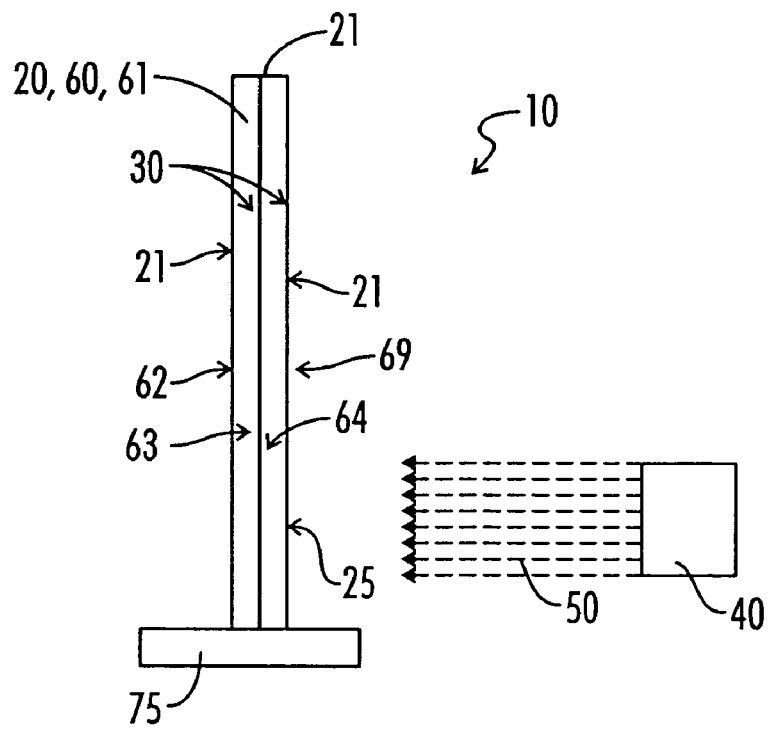
FIG. 1 is a schematic representation of a bimorphic polymeric photomechanical body.
Figure 2:
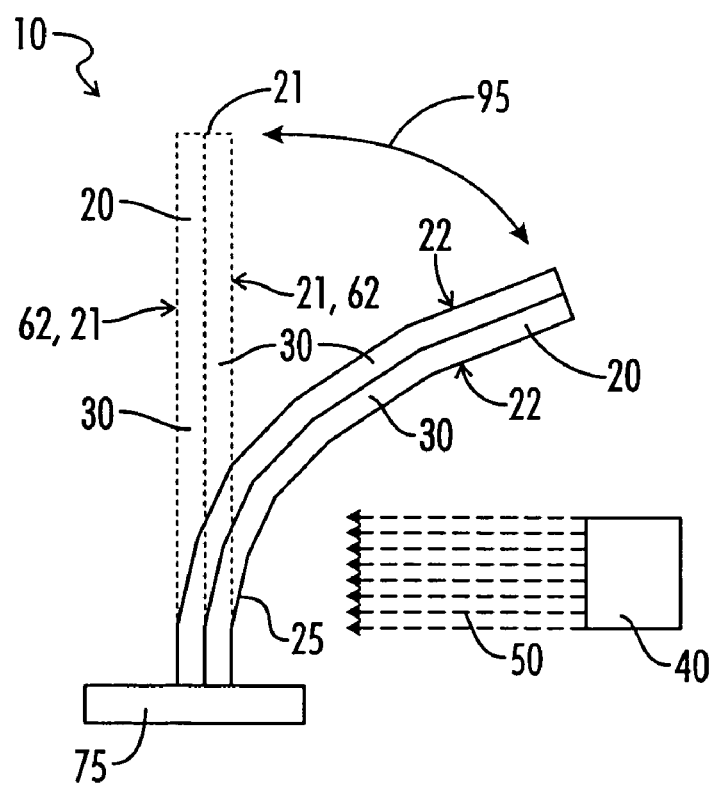
FIG. 2 is a schematic representation of the bimorphic polymeric photomechanical body of FIG. 1 using a light output to create bimorphic movement.

FIG. 1 shows one embodiment of the apparatus 10 of the present invention. A photomechanical body 20 comprising a photomechanical polymeric material 30 is shown affixed to a base 75. The photomechanical body 20 has a normal state surface 21 defining its normal bulk dimensions without an applied field of light illuminating the photomechanical body 20. A light source 40 is shown generating a light output 50. In this embodiment, the light output 50 is adapted to emit light in the visible or infra-red light spectrum. The emissions can be discrete frequencies emissions, broadband emissions or continuous emissions. The emissions can be combined to produce numerous variations. Light output 50 is shaped as necessary to illuminate a desired portion of normal state surface 21. That portion of normal state surface 21 is termed the illumination surface 25. The illumination surface 25 comprises a photomechanical polymeric material 30. The photomechanical polymeric material 30 of the photomechanical body 20 is subjected to an applied field of selected light energy 51 by the illuminating light output 50 and undergoes a photomechanical effect that causes deformation of its normal state surface 21 and its normal bulk dimensions. Such change in bulk dimension is shown in FIG. 2 by the actuated state surface 22 of the photomechanical body 20. Upon removal of the illuminating light output 50, the photomechanical body 20 rapidly returns to its original normal state surface 21 and its normal bulk dimensions. In the embodiment shown in FIG. 2, the deformation is essentially elastic. FIG. 2 further shows the path 95 swept out by the end of the photomechanical body 20 distal to the base 75 as the photomechanical body 20 deforms between its normal state surface 21 and its actuated state surface 22. One skilled in the art will recognize that the elastically deforming photomechanical body 20 can be used as an actuating mechanism for transforming light energy into another energy form by positioning a receiving structure so that the photomechanical body 20 contacts a movable receiving structure as the photomechanical body 20 undergoes deformation. One skilled in the art will recognize that the elastically deforming photomechanical body 20 can also be used as an actuating element for positioning a contact in switching mechanisms such as optical switches or electro-optical switches.

For the embodiment of the current invention shown in FIG. 1, the dominant mechanism by which light produces a photomechanical effect is the photothermal mechanism. As stated above, the polymeric photomechanical material 30 comprises a polymeric photosensitive material 31. Light energy is absorbed by the polymeric photosensitive material 31 and converted to heat. The material's temperature increases, which, through thermal expansion of the bulk material, results in mechanical deformation. Typical characteristic time of the photothermal mechanism is of the order of milliseconds and the magnitude of the effect is large. Strain (relative bulk dimensional deformation) due to the photothermal mechanism can be 1.0% and higher. In one embodiment of the invention, the required illumination intensity of the photothermal mechanism is of the order of 0.01 W/cm$^2$.

One secondary mechanism by which light produces a photomechanical effect in this embodiment of the present invention is photostriction. The photostriction mechanism is a combination of photoelectric and converse piezoelectric mechanisms. Light generates an electric field in the photoelectric material through photoconductance, photovoltaic, pyroelectric effects, or a combination thereof. The electric field produces mechanical deformation due to piezoelectricity. Typical characteristic time of the photostriction mechanism is greater or equal to few milliseconds and the magnitude of the effect of photostriction does not exceed 0.5% strain. In one embodiment of the invention, the required illumination intensity of the photostriction mechanism is of the order of $4 \times 10^{-3}$ W/cm$^2$. However, the contribution of the photostriction mechanism to the photomechanical effect may be significantly limited by heating effects of the illuminating light.

An additional secondary mechanism by which light produces a photomechanical effect in this embodiment is electrostriction. Light generates an optical field gradient on the interface boundary between two dielectric media. This causes the deformation of the boundary and contributes to mechanical deformation of the photomechanical body 20. Typical characteristic time of the electrostriction mechanism is of the order of $10^{-9}$ seconds and the magnitude of the effect of electrostriction is of the order of 0.01% strain. In one embodiment of the invention, the required illumination intensity of the electrostriction mechanism is of the order $10^3$ W/cm$^2$.

A tertiary mechanism by which light produces a photomechanical effect in this embodiment is molecular reorientation. Molecular reorientation is a mechanism that, under the right conditions, contributes to the photomechanical effect. If the illuminating light is polarized and illuminates a photosensitive molecule, the long axis of the photosensitive molecule will align along the direction of the optic field. If these photosensitive molecules are embedded in a polymer, the molecule-polymer interaction will stress the polymer and result in deformation. The molecular reorientation mechanism can be fast (characteristic time of the order of $10^{-12}$ seconds) with little mechanical deformation (less than 0.001% strain) or it can be very slow (characteristic time of the order of 0.5 hour) with pronounced mechanical deformation (up to 50% strain). In the present invention, the effects of the molecular reorientation mechanism are small.

In one preferred embodiment of the present invention, the polymeric photomechanical material 30 comprises a photosensitive polyvinylidene fluoride 34 (PVDF). In that embodiment, all of the above-identified mechanisms combine to produce a photomechanical effect when the PVDF 34 is illuminated with light. However, in PVDF 34 the photothermal mechanism is the dominate mechanism. Other polymeric photomechanical materials 30 may be selected such that the photomechanical effect is produced by a combination of the above-identified mechanisms or a subset thereof. In one such embodiment shown in FIG. 6, the polymeric photomechanical material 30 comprises a photosensitive mylar 36. The photosensitive mylar 36 undergoes a comparable photomechanical effect when the mylar 36 is illuminated with light. It is thought that the dominate mechanism of the photomechanical effect in polymeric photomechanical materials 30 would remain the photothermal mechanism, although the relative contributions amongst the various mechanisms may differ.

Figure 6:
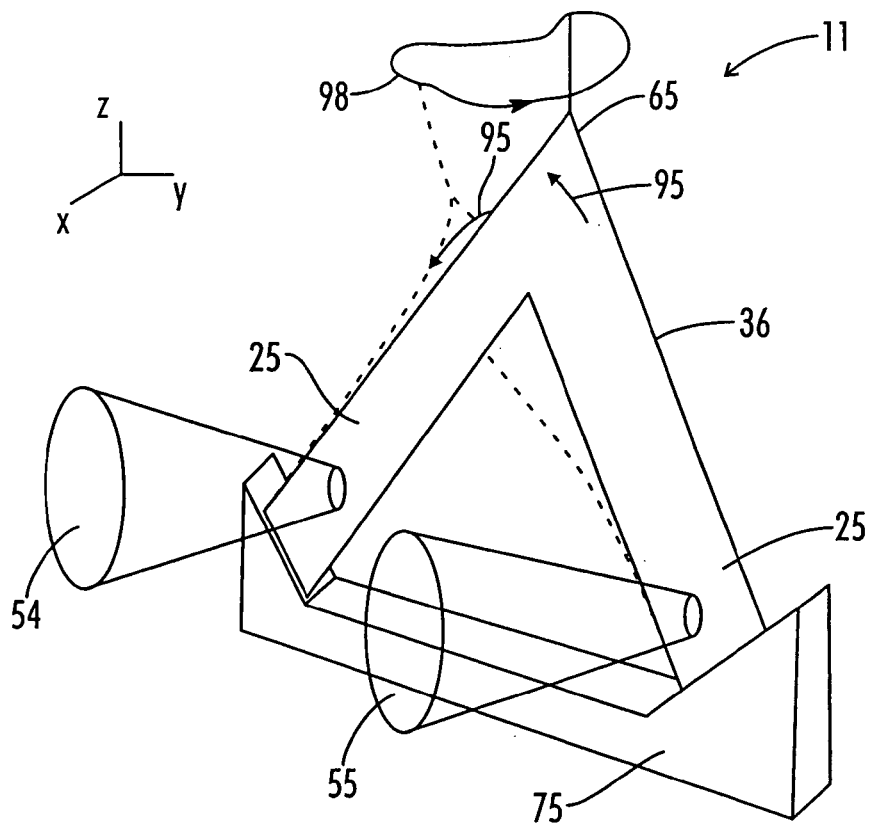
FIG. 6 is a schematic representation of a single body multiple movement bimorphic polymeric photomechanical actuator.

In the preferred embodiment of the present invention shown in FIG. 6, the structure of the photomechanical body 20 comprises a film or thin sheet 65 of polymeric photomechanical materials 30. In alternative embodiments of the present invention, the structure of the photomechanical body 20 comprises a fiber, strand, rod or other elongated structure of polymeric photomechanical materials 30.

In the photomechanical body 20 shown in FIG. 1, the polymeric photomechanical material 30 comprises a non-isotropic polymeric photomechanical material 32 that has at least one non-isotropic, intrinsic photosensitive characteristic in that the polymeric material has at least one intrinsic photosensitive property having a parametric value that varies as regards at least one dimension of the structure of the photomechanical body 20. By proper selection of the specific polymeric photomechanical material 30 and treatment thereof, the photomechanical effect caused by illuminating such a photomechanical body 20 can provide mechanically advantageous results. In the embodiment of the present invention shown in FIG. 1, the photomechanical body 20 comprises a plate 60 of polymeric photomechanical material 30 that has been selected and treated such that there is a gradient across the thickness of the plate 60 as regards the thermal coefficient of linear expansion of the polymeric photomechanical material 30. In this embodiment, the plate 60 comprises a first major opposing surface 62 and a second major opposing surface 69. The plate 60 further comprises a first plate layer of polymeric photomechanical material 63 and a second plate layer of polymeric photomechanical material 64. The gradient of the value of the thermal coefficients of linear expansion between the major opposing surfaces 62, 69 may be linear or non-linear, depending on the specific photomechanical polymeric material and the treatment thereof. In other embodiments of the present invention, the gradient of the parametric value varies in multiple dimensions. In yet other embodiments of the present invention, the intrinsic photosensitive property of the polymeric photomechanical material 30 having a non-isotropic parametric value that varies as a gradient within the photomechanical body 20 is a non-thermal intrinsic photosensitive property, such as photoconductance. In still other embodiments, individual gradients of parametric values of multiple intrinsic properties combine to form a complex gradient of combined parametric values.

FIG. 1 further shows a first plate layer of polymeric photomechanical material 63 defined by the first major opposing surface 62 and the plane bisecting the thickness dimension of the plate 60. A second plate layer of polymeric photomechanical material 64 is similarly defined by that plane and the second major opposing surface 69. In the embodiment of the present invention shown in FIG. 1, the average thermal coefficients of linear expansion in the first plate layer of polymeric photomechanical material 63 is greater than the average thermal coefficients of linear expansion in the second plate layer of polymeric photomechanical material 64. FIG. 2 shows a light source 40 irradiating a surface of the photomechanical body 20 of the embodiment of the inventions shown in FIG. 1. FIG. 2 shows the bulk deformation caused by a photomechanical effect. The photothermal mechanism is the dominant mechanism causing the photomechanical effect in the embodiment of the invention shown in FIG. 2. The light energy is absorbed by the polymeric photomechanical material 30 and is converted to heat, causing the material's temperature to increase. The plate 60 of polymeric photomechanical material 30 is sufficiently thin that the temperature differential across the plate's thickness dimension is negligible. Linear expansion occurs along the length, width and thickness of the plate 60 and causes mechanical deformation of the photomechanical body. However, in relative terms, the length of the plate 60 is significantly larger than either the width or thickness of the plate.

Referring to FIG. 2, plate 60 comprises an elongated plate 61, wherein its length is substantially greater than its width or thickness such that the photomechanical deformations are most pronounced along the longest axis of the strip. The first plate layer of polymeric photomechanical material 63 will expand more than the second plate layer of polymeric photomechanical material 64, since the temperature increase is the same for both layers and the first has a greater thermal coefficient of linear expansion. Since the plate layers are affixed to each other, the unequal expansion causes the elongated plate 61 to bend as it deforms from the bulk dimensions of the normal state surface 21 to the bulk dimensions of the actuated state surface 22. FIG. 2 shows a proximal end of the elongated plate 61 affixed to a base 75. In this configuration, light source 40 irradiates the illumination surface 25 causing a photomechanical effect and producing large deflections of the distal end of the elongated plate 61 in a manner similar to that of a bimetallic thermostat strips.

Herein, a photomechanical body 20 having regions or layers of polymeric photomechanical material 30 selected or treated such that the photomechanical body 20 comprises a non-isotropic polymeric photomechanical material 32 is defined, as bimorphic photomechanical body 24. In the embodiment shown in FIG. 2, the bimorphic photomechanical body 24 comprises a bimorphic photomechanical plate 26 comprising two layers of polymeric photomechanical material 30. In alternate embodiments of invention, the bimorphic photomechanical plate 26 comprises multiple layers of polymeric photomechanical material 30. In additional alternate embodiments of invention, the bimorphic photomechanical plate 26 comprises a single layer of non-isotropic polymeric photomechanical material 32. Similarly, in various alternate embodiments of the invention, the bimorphic photomechanical body 24 selectively comprises a bimorphic photomechanical film, a thin bimorphic photomechanical sheet, a bimorphic photomechanical fiber, and a bimorphic photomechanical wound strand. This invention contemplates numerous other structures of bimorphic photomechanical bodies.

As stated above, a bimorphic photomechanical body 24 may be formed by either proper selection and affixing of polymeric photomechanical materials 30 to form a non-isotropic polymeric photomechanical material 32, or by treatment of a polymeric photomechanical material 30 to form a non-isotropic polymeric photomechanical material 32. For example, a bimorphic photomechanical body 24 may be formed as a result of fabrication process of a number of polymer films such as mylar and PVDF. These polymers after being processed into thin films are usually rolled and stored into rolls. This creates an effect of "memory" in the film. After being cut into plane sheets, the film still "remembers" its initial shape in a roll. This is due to the initial packing of the polymer molecules trying to adjust for the shape of the film in a roll. The outer half of the film, which is more distal to the center of the roll, will have a greater thermal coefficient of linear expansion while the inner part tends to expand less. Thus, the process of light induced heating returns the film to its cylindrical shape. Even bending the film in the opposite direction (with respect to its original curvature in a roll) and storing it bent for a year does not change the film's tendency to return to its original curvature upon the illumination.

Bimorphic photomechanical properties can be induced in polymeric photosensitive materials by a number of techniques. One method is exposure of a photosensitive polymeric film or fiber to UV radiation. In polymers which have strong absorption coefficients for UV light, such as polyimide, this can create a modification of molecules preferably on the UV exposed side. The modification will make the exposed polymer less expandable due to light-induced heating than that on the opposite side. Other methods of surface treatment of polymeric photosensitive materials that similarly modify polymer molecular structure can be suggested for making a bimorph: ion or electron beam modification, differential drying, chemical processing by a gas or liquid, etc. An alternative method of forming a bimorphic photomechanical body 24 is to coat one side of a photosensitive polymeric film with an adhesive layer that has a substantially different thermal coefficient of linear expansion or a substantially different parametric value of another intrinsic photosensitive property. Similarly, yet another method of forming a bimorphic photomechanical body 24 is to adhere one photosensitive polymeric film to another photosensitive polymeric film that has a substantially different thermal coefficient of linear expansion or a substantially different parametric value of another intrinsic photosensitive property.

The present invention is directed to providing a simple, compact, and inexpensive means of converting low power visible or mid-infrared radiation into mechanical movement and mechanical work. In one embodiment, the actuating light is transmitted over conventional optic fibers and through a lens assembly. In this embodiment, a low power light source of less than 300 mW is used to generate mechanical displacement of the order of up to 10 mm. The light source is a visible light source which uses visible and near-infrared (400 nm to 1550 nm) light which can be transmitted through optic fibers. A pulsed light generator may be utilized for conversion of continuous light into a series of light pulses that are delayed with respect to each other. Light delivery may then be performed in the present invention by use of single or multiple mode conventional optic fibers. Beam shaping optics are used to shape the light beams to illuminate the polymer body. One embodiment of the present invention uses a polymer body made of a gold-coated 50-$\mu$m-thick film of polymer PVDF which bends along the direction of the beam of visible light sent to the film. This contrasts with the prior art's use of a bimorph based on photosensitive PLZT ceramics, which gains strain due to photovoltaic effect in combination with converse piezoelectric effect. The prior art bimorph bends when its PLZT part elongates after illumination with UV light.

The body of the photo-driven actuator is made of photosensitive piezoelectric polymer such as polyvyniledene fluoride known as PVDF. PVDF is a well known piezoelectric polymer but its behavior as a photosensitive material may be utilized for changing its shape in response to visible light.

Figure 3:
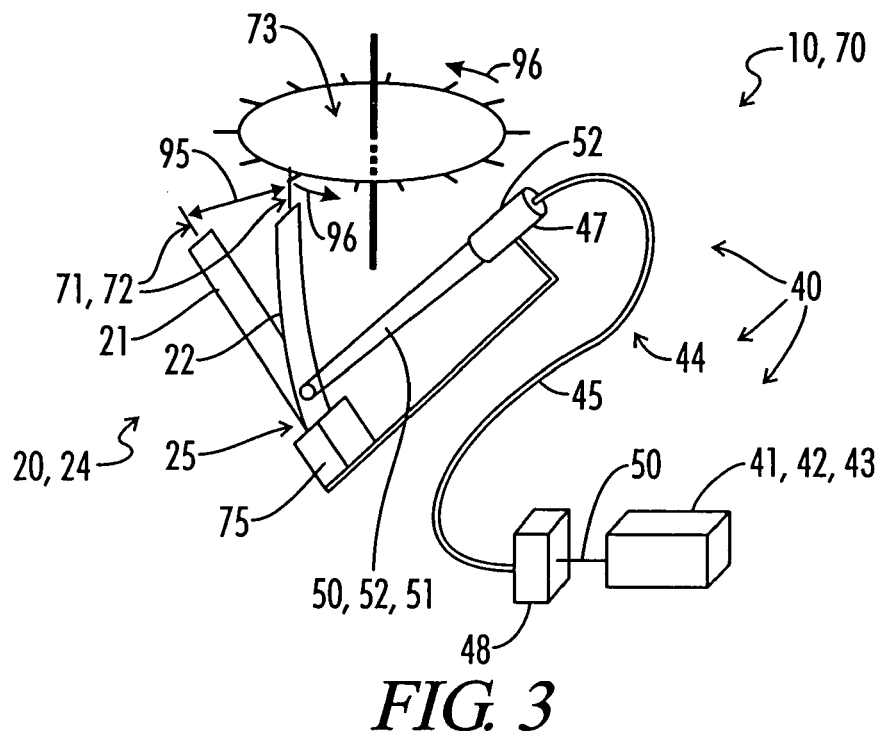
FIG. 3 is a schematic representation of a bimorphic polymeric photomechanical body using a pulsed light output to create movement of a reciprocating bimorphic polymeric photomechanical actuator.

Referring now to FIG. 3, photomechanical apparatus 10 of this invention comprises a photomechanical actuator 70. The photomechanical actuator 70 shown in FIG. 3 comprises a bimorphic photomechanical body 20 having an illumination surface 25. An actuator output element 71 is shown affixed to the bimorphic photomechanical body 20. In this embodiment the actuator output element 71 comprises an actuator output arm 72, although other structures could be substituted as an actuator output element 71. The bimorphic photomechanical body 20 is shown in both its normal state, shown as normal state surface 21, and its actuated state, shown as actuated state surface 22. A light source 40 generates a light output 50, which is used to illuminate illumination surface 25. The bimorphic photomechanical body 20 deforms from the its normal state surface 21 to its actuated state surface 22 in response to illumination of the illumination surface. Such deformation moves the actuator output element 71 along path 95 to the actuator receiving element 73. The actuator receiving element 73 is adapted to receive the actuator output element 71 and be movably displaced by the actuator output element 71 along path 96, thus converting the kinetic energy of the bimorphic photomechanical body 20 into another form of energy. In this embodiment, the other form of energy is the kinetic energy of rotation of the actuator receiving element 73.

In this embodiment of the present invention, the light source 40 comprises a light generation device 41 and a light transfer device 44. The light generation device 41 is adapted to generate a pulsed light output 53. In this embodiment, light generation device 41 comprises a laser 42 for generating a light output 50 in the spectrum between 300 nm and 10000 nm. In another embodiment, light generation device 41 comprises a laser 42 for generating a light output 50 in the spectrum between 400 nm and 3000 nm. Referring again to the embodiment in FIG. 3, the light generation device 41 further comprises a pulsed light generator 48 for converting the light output 50 to a pulsed light output 53. In this embodiment, the laser 42 is an Ar-ion laser 43 operating at 488 nm. However, many other types of lasers are suitable for use in this invention, depending on the particular polymeric photomechanical material 30 selected for use in the bimorphic photomechanical body 24. Examples of lasers used in typical variations of this and similar embodiments for generating a light output 50 in the spectrum between 300 nm and 10000 nm include: He—Ne lasers; Nd: YAG lasers; Ti: sapphire lasers; tunable solid state and dye lasers; semiconductor lasers; and carbon dioxide lasers. The He—Ne laser operates at 632.8 nm. The Nd: YAG laser operates at 1064 nm and at the second harmonic of 532 nm. The Ti: sapphire lasers are tunable between 750 nm and 950 nm, while solid state and dye lasers are tunable between 400 nm and 3000 nm. Semiconductor lasers are selectable for operation at specific wavelengths from 400 nm to 3000 nm. However, the most suitable semiconductor lasers for commercial fiber optic systems are those which operate at 800 nm, 1300 nm, or 1550 nm. Semiconductor lasers; operating at 1300 nm or 1550 nm are particularly adaptable for use in long distance fiber optic communication. Carbon dioxide ($CO_2$) laser operating at approximately 10000 nm produces radiation that is strongly absorbed by pure polymer PVDF. However, only limited types of optical fibers are designed to transmit Carbon dioxide ($CO_2$) laser radiation, and then only for relatively short distances of less than 10 ft.

Referring again to FIG. 3, the light transfer device 44 of the embodiment shown comprises a fiber optic cable 45 designed to direct the pulsed light output 53 from the light generation device 41 to the illumination surface 25 of the bimorphic photomechanical body 20. In this embodiment, the light output 50 can be in the visible or infrared spectrum between 400 and 1550 nm. Operating in the visible or infrared spectrum between 400 and 1550 nm makes it practical to deliver the pulsed light output 53 to the photomechanical body 20 via conventional optical fibers without the significant loss of light energy of the prior art. In the preferred embodiment of the present invention, the pulsed light output 53 is transferred via a multi-mode fiber optic cable 45 to an optical system 47 designed to direct the pulsed light output 53 upon the illumination surface 25 of the bimorphic photomechanical body 20.

Since the bimorphic photomechanical body 20 is comprised of a polymeric material, it has significant advantages over the PLZT ceramics of the prior art. Among the advantages of polymeric photomechanical materials 30 is greater mechanical flexibility and significantly greater maximum strain in elastic deformation. Furthermore, the efficiency of conversion of the energy of light into mechanical work is higher than that of the materials of the prior art. In the embodiment shown in FIG. 3, the preferred bimorphic photomechanical body 20 comprises a photosensitive polyvinylidene fluoride (PVDF) 34. One preferred photosensitive polyvinylidene fluoride (PVDF) 34 is made from a gold coated 50-$\mu$m-thick PVDF layer forming a bimorphic polyvinylidene fluoride film 38, which is specifically adapted for reciprocally and reversibly changing its shape after being illuminated with one or multiple light beams. This provides a spring like effect. The light exposure bends the film in a first direction and then after exposure is removed, the film returns to its original position, providing a quick reciprocal movement. In one embodiment, upon the illumination with a 15-mW He—Ne laser, a PVDF film with dimensions of 5×40 mm produced a maximum static force of approximately $1.0 \times 10^{-4}$ N. The force is enough to accelerate a 1-g object from rest to a speed of 10 cm/s in one second. The maximum travel distance of the free end of the bimorphic film was 5 mm over a period of time of 1 s. The bending is shown in FIG. 3 with the movement illustrated by path 95.

The functional operation of the reciprocating photomechanical actuator 70 may be further understood with reference to FIG. 3 where the continuous light output 50 from the light source 40 is converted by the pulsed light generator 48 to a pulsed light output 53 having certain characteristics with respect to the pulse, including pulse amplitude, pulse duration and pulse repetition rate. The pulsed light output 53 is coupled with fiber optic cable 45 and transmitted towards the bimorphic photomechanical body 24. The pulsed light output 53 is decoupled from the fiber optic cable 45, shaped by an optical system 47. The optical system 47 directs the beam to the illumination surface 25 on the bimorphic photomechanical body 24. The bimorphic photomechanical body 24 bends and changes its shape in response to the illumination of each pulse of the pulsed light output 53. This deformation moves the actuator output element 71 along path 95 to the actuator receiving element 73 producing mechanical motion of the actuator receiving element 73 along path 96. The bimorphic photomechanical body 24 will return to its original shape after each light pulse has been removed and reset for the next pulse.

Figure 4:
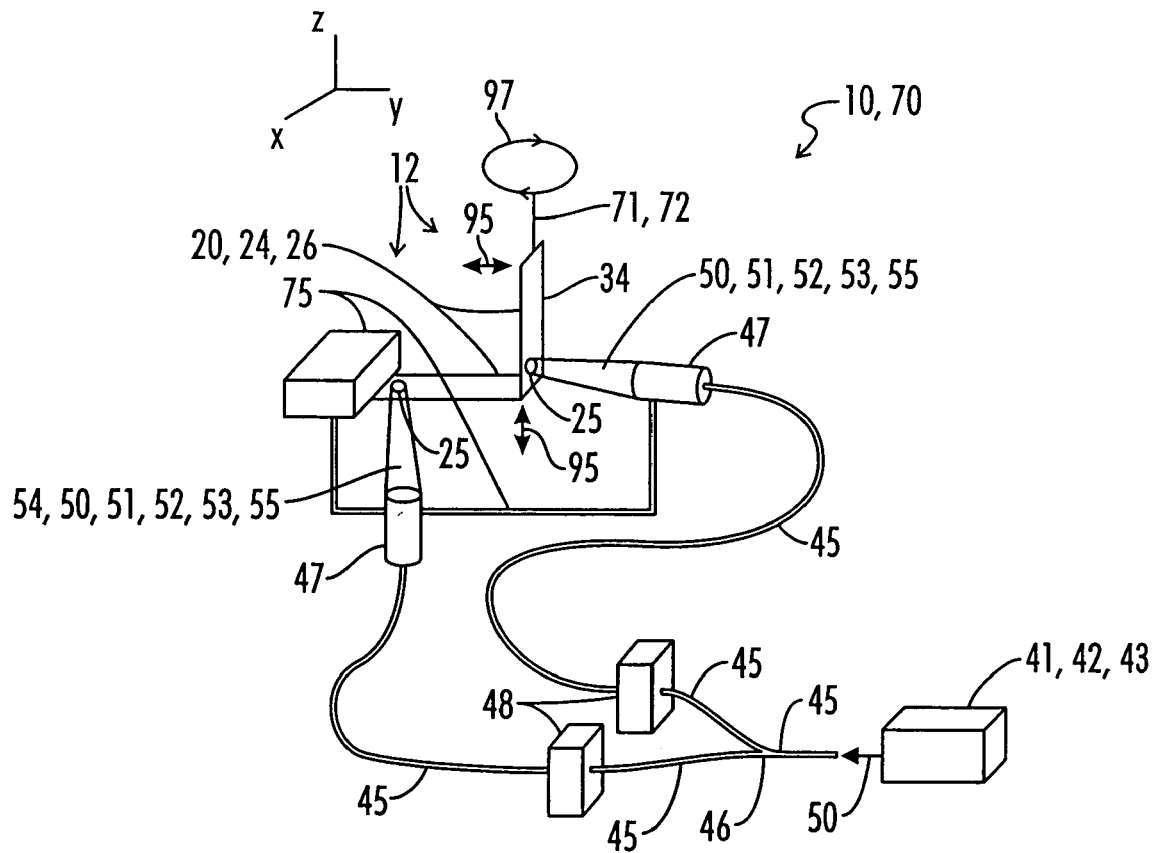
FIG. 4 is a schematic representation of a two body, multiple movement bimorphic polymeric photomechanical actuator.

Referring now to FIG. 4, an embodiment of a reciprocating photomechanical actuator 70 is shown having a two range bimorphic photomechanical assembly 12. The two range photomechanical actuator 70 includes a laser 42 for providing a coherent beam 52. A preferred embodiment uses an Ar-ion laser 43 operating at 488 nm. The Ar-ion laser 43 generates a coherent beam 52 with sufficient strength to be split into a first light output 54 and a second light output 55 by the multi-mode optic fiber splitter 46 in to the arms of the splitter 46. Each arm then goes into separate optic systems 47 through the separate pulsed light generators 48 and into separate fiber optic cables 45. The first light output 54 is directed toward the illumination surface 25.

Complex actuating motions are possible using bimorphic photomechanical bodies in various configurations. For example, two ranges of motion for a bimorphic photomechanical assembly 12 are shown in FIG. 4, with both ranges of motion moving the actuator output element 70. This bimorphic photomechanical assembly 12 comprises two bimorphic photomechanical plates 26 affixed to each other in an orthogonal orientation and each having freedom of movement in the y-z plane. This produces a trajectory of motion of the actuator output element 71 in the y-z plane. Note, that in this embodiment, the first light output 54 and the second light output 55 have the same pulse duration and pulse repetition rate. Where the light outputs 54, 55 have a generally sinusoidal pattern and the time delay between the sinusoidal patterns is close to the quarter of period, the trajectory of motion of the actuator output element 71 will follow a generally elliptical path 97. The shape of the trajectory may be varied by changing the pulse duration, pulse amplitude, and the time delay between the pulses in each light output.

Figure 5:
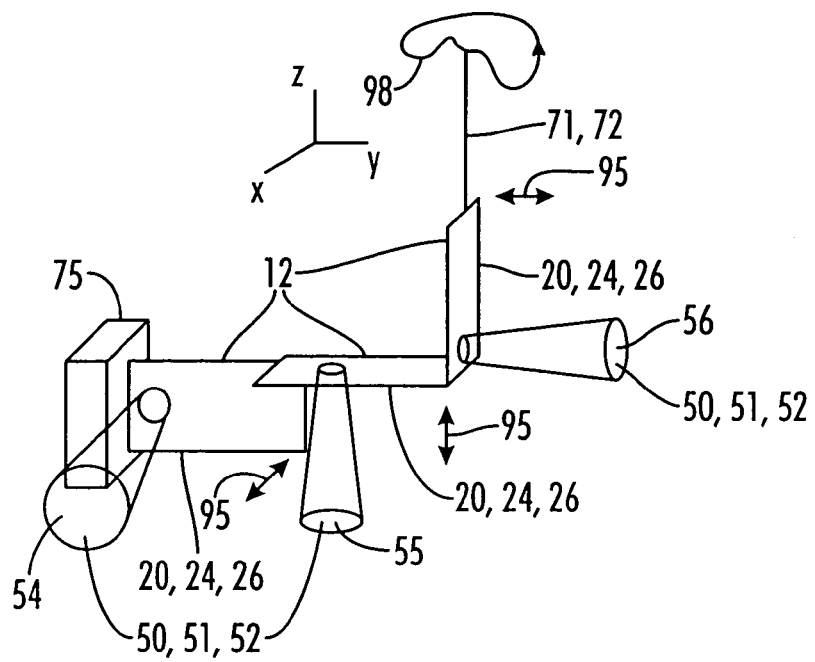
FIG. 5 is a schematic representation of a three body, multiple movement bimorphic polymeric photomechanical actuator.

Referring now to FIG. 5, an embodiment of a reciprocating photomechanical actuator 70 is shown having a three range of motion bimorphic photomechanical assembly 12. This bimorphic photomechanical assembly 12 comprises three bimorphic photomechanical plates 26 affixed to each other in an orthogonal orientation and each having freedom of movement in a plane. In alternate embodiments, a single bimorphic photomechanical plate 26 is constructed in a twisted manner to provide for the three ranges of control. FIG. 5 shows a first, second and third light output 54, 55, 56, each light output directed toward an illumination surface 25 of a different bimorphic photomechanical body 24 of the bimorphic photomechanical assembly 12. This produces a trajectory of motion of the actuator output element 71 in the x-y-z space. Note, that in this embodiment, first, second and third light outputs 54, 55, 56, may have different pulse amplitude, pulse duration, pulse repetition rate, and time delay. This can produce a complex trajectory of motion of the actuator output element 71, shown as three dimensional compound path 98. The shape of the trajectory may be varied by changing the pulse duration, pulse amplitude, and time delay for at least one of the first, second or third light outputs 54, 55, 56.

Referring now to FIG. 6, the drawings shows a three dimensional range photokinetic apparatus 11 for positioning an executing element, said apparatus 11 having actuator output arm 72 adapted to transfer the movement of the output point to the executing element. The actuator output arm 72 is affixed to a bimorphic photomechanical body 24. The bimorphic photomechanical body 24 comprises a thin sheet 65 of a photosensitive mylar 36 and has multiple illumination surfaces 25. In an alternate embodiment, the bimorphic photomechanical body 24 comprises a bimorphic polyvinylidene fluoride film 38. FIG. 6 shows a first and second light output 54, 55, each light output directed toward different illumination surface 25 of the bimorphic photomechanical body 24. This produces a trajectory of motion of the actuator output element 71 in the x-y-z space. Note, that in this embodiment, the first and second light output 54, 55, may have different pulse amplitude, pulse duration, pulse repetition rate, and time delay between pulses in each output. This can produce rather a complex trajectory of motion of the actuator output element 71, shown as three dimensional compound path 98. The shape of the trajectory may be varied by changing the pulse duration, pulse amplitude, and time delay of pulses for at least one of first or second light output 54, 55. One of the possible applications of this embodiment could be in non-piezoelectric drives for cantilevers of a scanning probe microscope (SPM).

Figure 11A:
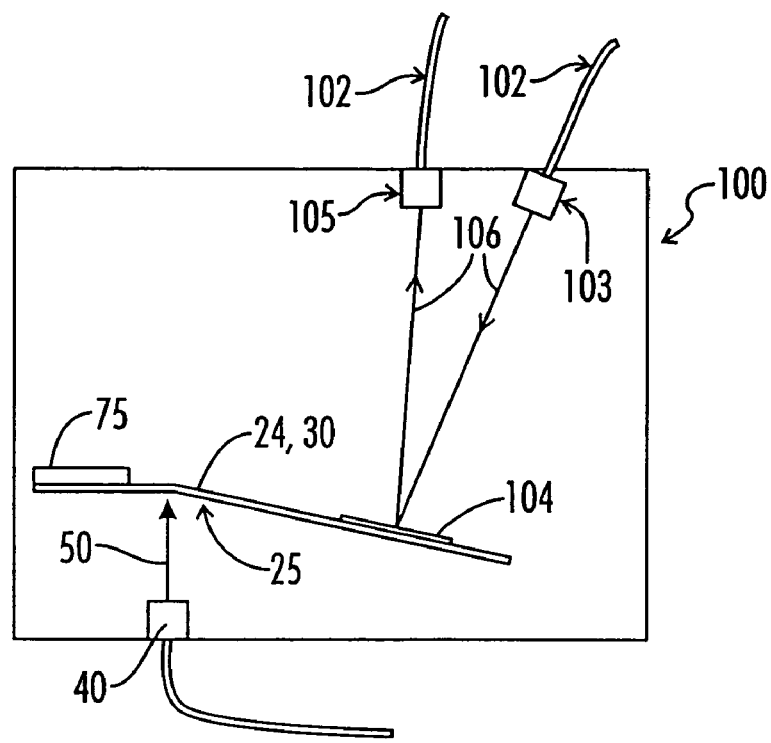
FIGS. 11a–11d are schematic representations of bimorphic polymeric photomechanical actuators in photonic switches.
Figure 11B:
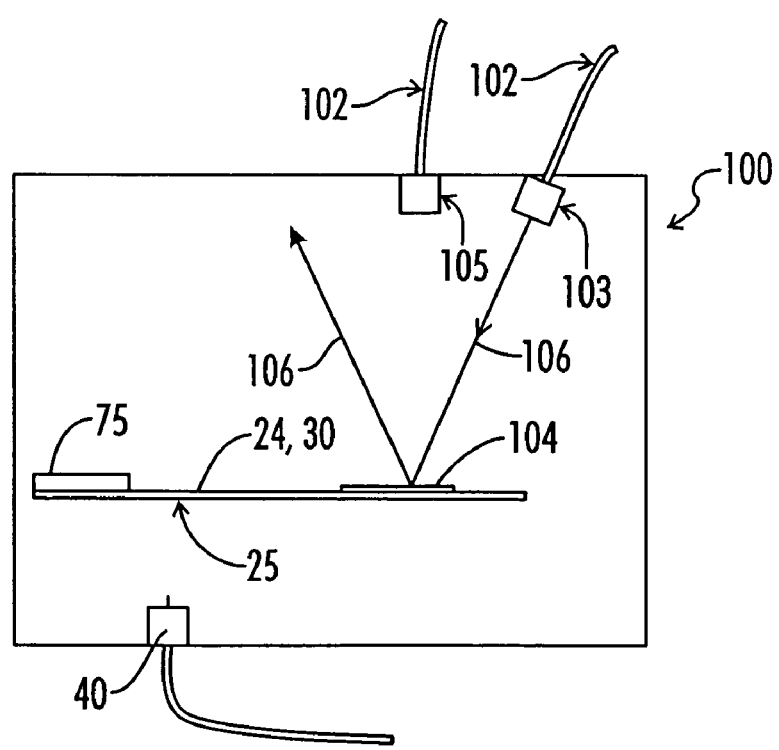

Referring to FIGS. 11a and 11b, a photonic switch 100 is shown as one embodiment of the present invention. The photomechanical photonic switch 100 includes a bimorphic photomechanical body 24 having an illumination surface 25. The bimorphic photomechanical body 24 is formed from a photomechanical polymeric material 30 and affixed to a base 75. A light source 40 is adapted to selectively generate a light output 50 to illuminate the illumination surface 25. The photonic switch 101 is disposed in a fiber optic circuit 102 and includes a fiber optic transmitter 103, a reflector 104 affixed to said bimorphic photomechanical body 24, and at least one fiber optic receiver 105. The fiber optic transmitter 103 is adapted to generate a signal light beam 106. When the photonic switch 100 is in the closed configuration, the reflector 104 is positioned to reflect the signal light beam 106 from the fiber optic transmitter 103 to the fiber optic receiver 105 and provides optical communication across the photonic switch 100. When the photonic switch 100 is configured in the open configuration, the reflector 104 is not positioned to reflect the signal light beam 106 from the fiber optic transmitter 103 to the fiber optic receiver 105 and, thus, interrupts optical communication across the photonic switch 100.

Referring to FIG. 11a, the photomechanical body 24 of the photonic switch 100 is illuminated and undergoes bimorphic deformation sufficient to position the reflector 104 so as to reflect the signal light beam 106 from the fiber optic transmitter 103 to the fiber optic receiver 105 and provides optical communication across the photonic switch 100. Thus, in this embodiment, the photonic switch 100 is configured so as to close when the photomechanical body 24 is illuminated. Referring now to FIG. 11b, the photomechanical body 24 of the photonic switch 100 is not illuminated and is in a normal, non-deformed state. In a normal state, the photomechanical body 24 positions the reflector 104 so as to not reflect the signal light beam 106 from the fiber optic transmitter 103 to the fiber optic receiver 105 and interrupts optical communication across the photonic switch 100. Thus, in this embodiment, the photonic switch 100 is configured so as to open when the photomechanical body 24 is not illuminated.

Figure 11C:
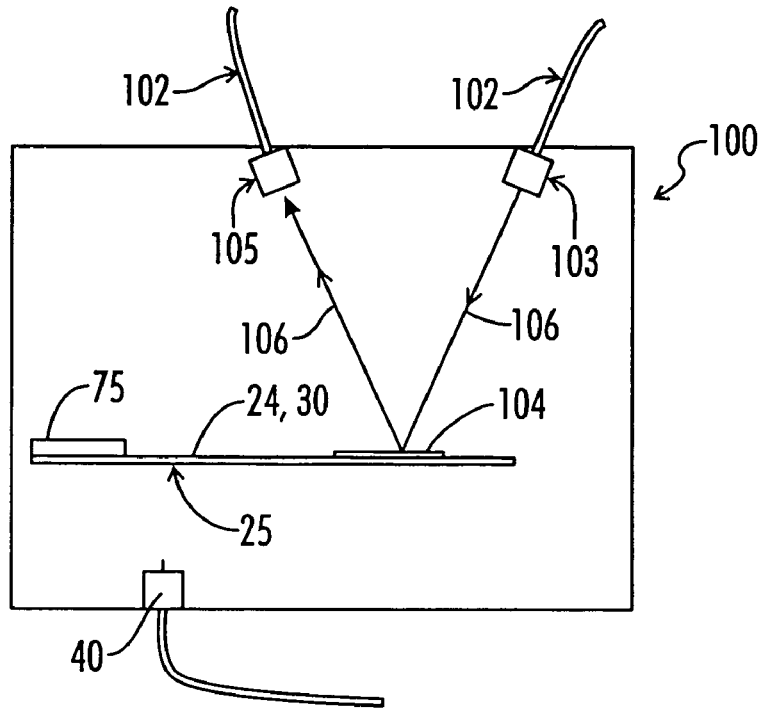
Figure 11D:
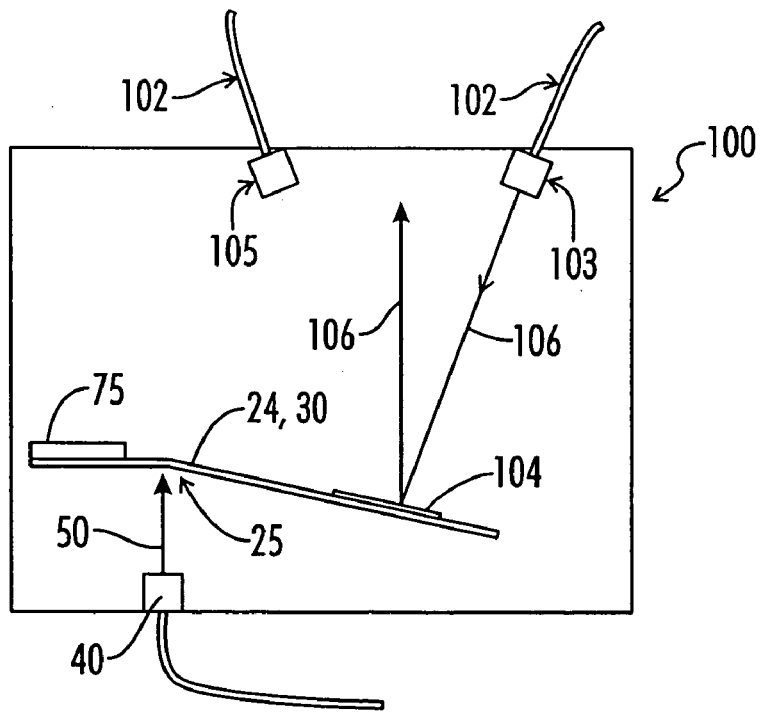

Referring to FIGS. 11c and 11d, a photonic switch 100 similar to the embodiment of FIGS. 11a and 11b is shown. Referring now to FIG. 11c, the photomechanical body 24 of the photonic switch 100 is not illuminated and is in a normal, non-deformed state. In a normal state, the photomechanical body 24 positions the reflector 104 so as to reflect the signal light beam 106 from the fiber optic transmitter 103 to the fiber optic receiver 105 and provides optical communication across the photonic switch 100. Thus, in this embodiment, the photonic switch 100 is configured so as to close when the photomechanical body 24 is not illuminated. Referring to FIG. 11d, the photomechanical body 24 of the photonic switch 100 is illuminated and undergoes bimorphic deformation sufficient to position the reflector 104 so as to not reflect the signal light beam 106 from the fiber optic transmitter 103 to the fiber optic receiver 105 and interrupts optical communication across the photonic switch 100. Thus, in this embodiment, the photonic switch 100 is configured so as to open when the photomechanical body 24 is illuminated.

In preferred embodiments of FIG. 11a–11d, the photomechanical polymeric material 30 is non-isotropic. Further, the light source 40 comprises a fiber optic illuminator similar to transmitter 103 and powered by laser 42, and more particularly by an infrared laser 43 of a communication wavelength 1300 or 1550 nm. One skilled in the art will recognize that may other configurations of the is photonic switch readily present themselves. For example, in one embodiment of the present invention, the fiber optic transmitter 103 and the fiber optic receiver 105 are positioned in a linear configuration such that the fiber optic transmitter 103 directly illuminates the fiber optic receiver 105 with the signal light beam 106. The photomechanical body 24 is be positioned such that it can be alternately configured 20 either to block the signal light beam 106 and interrupt optical communication or to allow the signal light beam 106 to pass and allow optical communication. Such alternate configuration of the photomechanical body 24 is determined by the illumination or non-illumination of the photomechanical body 24. Other embodiments of the photonic switch 100 of the present invention incorporate multiple the fiber optic transmitters 103 and the fiber optic receivers 105.

Figure 7A:
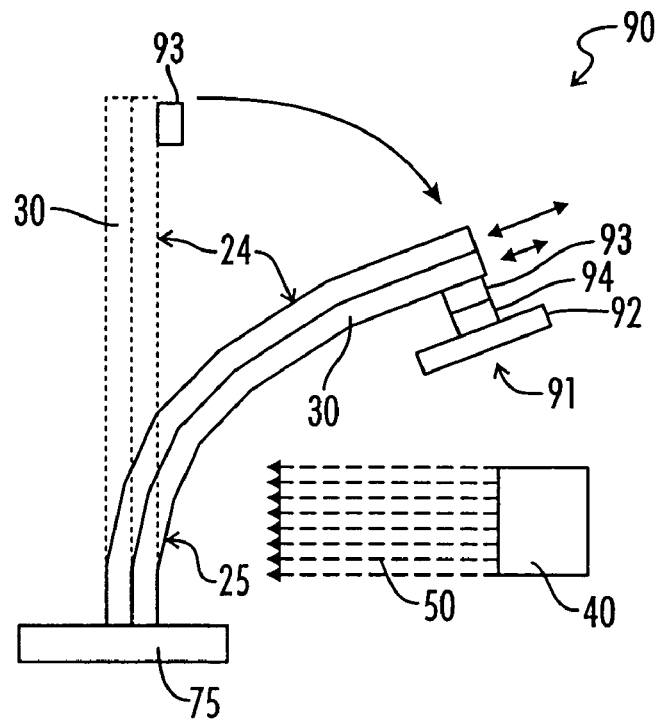
FIGS. 7a and 7b are schematic representations of bimorphic polymeric photomechanical actuators in optically driven electronic switches.
Figure 7B:
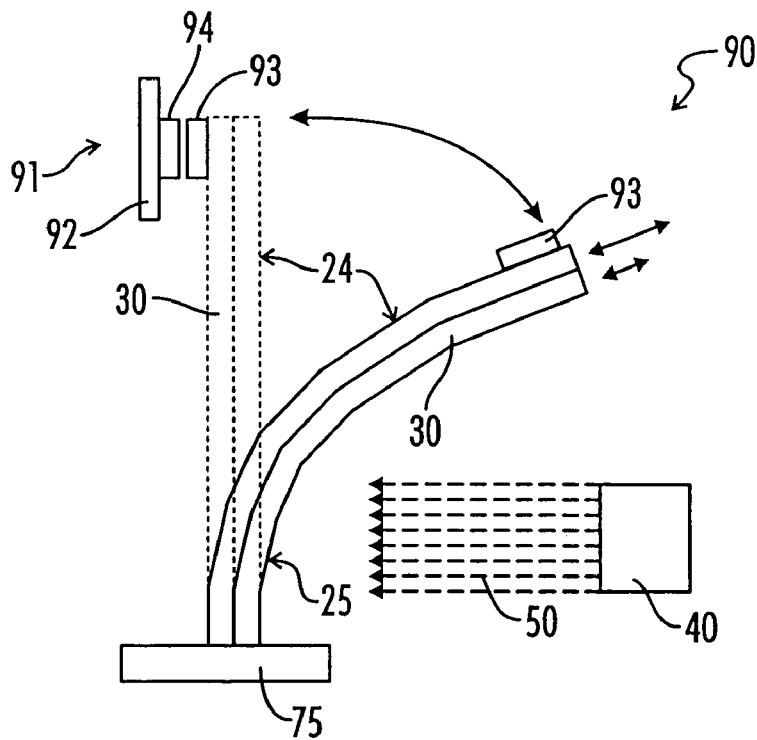

Referring to FIGS. 7a and 7b, a photomechanical electronic switch 90 is shown as one embodiment of the present invention. The photomechanical electronic switch 90 includes a bimorphic photomechanical body 24 having an illumination surface 25. The bimorphic photomechanical body 24 is formed from a photomechanical polymeric material 30 and affixed to a base 75. A light source 40 generates a light output 50 to illuminate the illumination surface 25. An electronic switch 91 includes a switch contact 93 affixed to the bimorphic photomechanical body 24 and at least one circuit contact 94 disposed in an electrical circuit 92. Referring to FIG. 7a, this embodiment of the photomechanical electronic switch 90 is configured to position the switch contact 93 so as to close the electronic switch 91 when the photomechanical body 24 is illuminated (shown in solid lines) and to position the switch contact 93 so as to open the electronic switch 91 when the photomechanical body 24 is not illuminated (shown in broken lines). Referring to FIG. 7b, this embodiment of the photomechanical electronic switch 90 is configured to position the switch contact 93 so as to open the electronic switch 91 when the photomechanical body 24 is illuminated (shown in solid lines) and to position the switch contact 93 so as to close the electronic switch 91 when the photomechanical body 24 is not illuminated (shown in broken lines). In a preferred embodiment, the light source 40 comprises a laser 42, and more particularly an Ar-ion laser 43.

Figure 8:
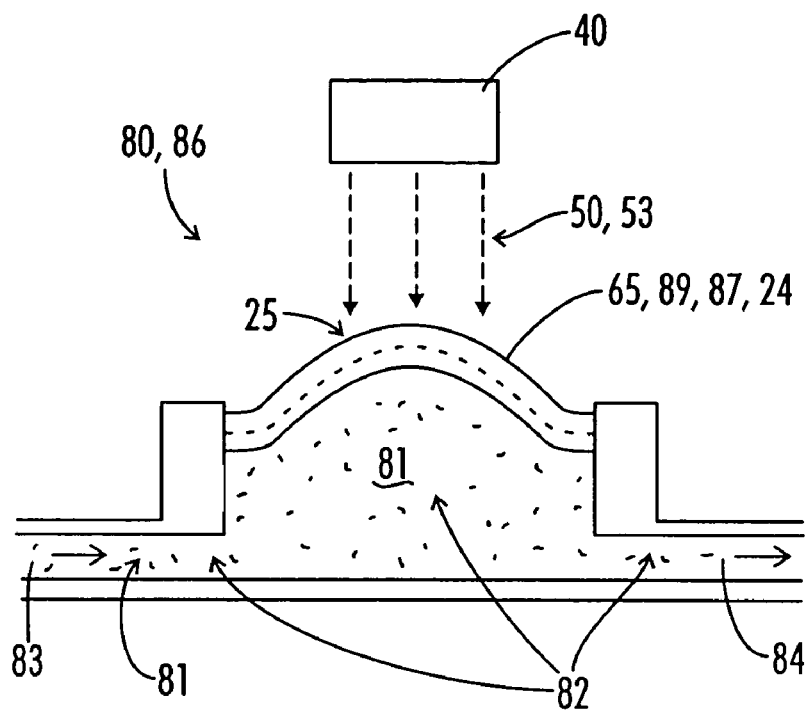
FIG. 8 is a schematic representation of a bimorphic polymeric photomechanical actuator in a fluidic diaphragm pump.

The photomechanical actuators 70 of this invention are light driven and do not require electrical power or electrical contacts. It would be highly desirable to integrate the photomechanical actuators 70 of this invention, especially as photomechanical fluidic pumps 80, into micro-electro-mechanical or micro-electro-opto-mechanical systems (MEMS/MEOMS) such as MEMS fuel cells. Two embodiments of the photomechanical actuators 70 are disclosed as photomechanical fluidic pumps 80. Referring now to FIG. 8, a photomechanical fluidic pump 80 is shown comprising a fluidic diaphragm pump 86. The fluidic diaphragm pump 86 comprises a fluidic pump chamber 82, an inlet port 83, and a fluid outlet port 84. A bimorphic photomechanical body 24 is shown comprising a fluidic actuator 87 for providing actuating motion to pump the fluid 81 from the fluidic pump chamber 82 through the fluid outlet port 84. A bimorphic photomechanical sheet 89 comprising a photomechanical polymeric material 30 is disposed adjacent to the fluidic pump chamber 82 and comprises the bimorphic photomechanical body 24. A light source 40 is shown generating a pulsed light output 53 to illuminate an illumination surface 25. The bimorphic photomechanical sheet 89 is adapted to move bimorphically in response to illumination of said illumination surface by said light output, and is shown in an activated deformation, bending away from the fluid 81 in the fluidic pump chamber 82. This generates a lower pressure in the chamber and draws fluid 81 from the fluid inlet port 83 into the fluidic pump chamber 82. When the illumination of the illumination surface 25 is removed, the bimorphic photomechanical sheet 89 returns to its original dimensions and exerts a compressive force against the fluid 81, thus, raising the pressure in the chamber and forcing the fluid through the fluid outlet port 84. In an alternate embodiment of the invention, the orientation of the bimorphic photomechanical sheet 89 is reversed such that the sheet bends downward into the fluid 81 when activated by the illumination of the illumination surface 25.

Figure 9:
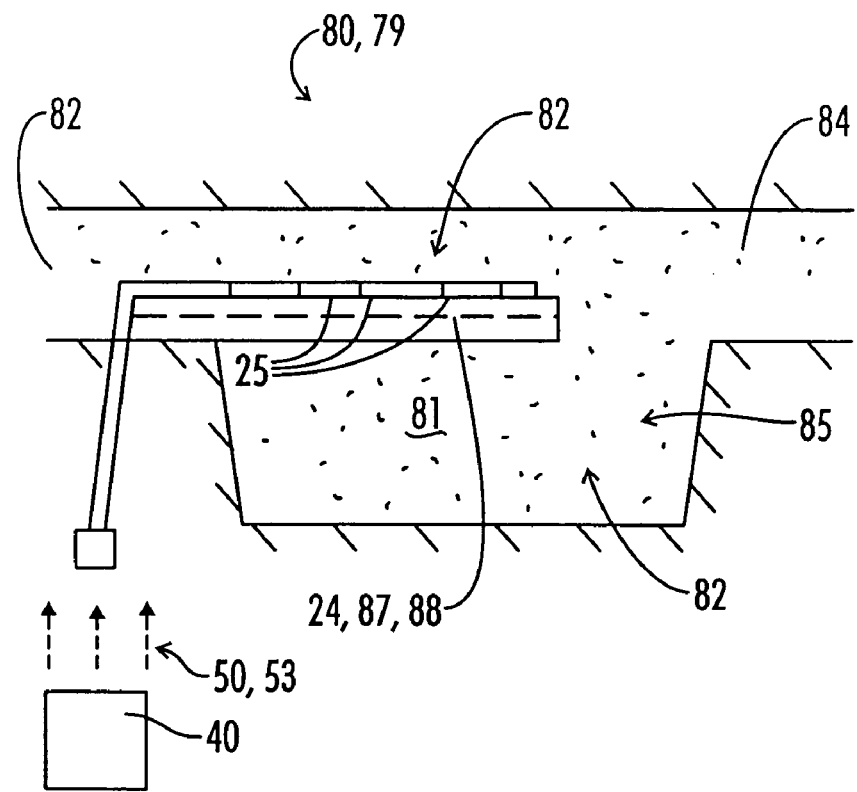
FIG. 9 is a schematic representation of a bimorphic polymeric photomechanical actuator in a cantilevered beam-resonance chamber fluidic pump.

Referring now to FIG. 9, a photomechanical fluidic pump 80 is shown comprising a fluidic resonance pump 79. The fluidic resonance pump 79 comprises a fluidic pump chamber 82, an inlet port 83, and a fluid outlet port 84. A bimorphic photomechanical body 24 is shown comprising a fluidic actuator 87 for providing actuating motion to pump the fluid 81 from the fluidic pump chamber 82 through the fluid outlet port 84. A bimorphic photomechanical cantilevered beam 88 comprising a photomechanical polymeric material 30 is disposed above a resonance chamber 85 within the fluidic pump chamber 82 and comprises the bimorphic photomechanical body 24. A light source 40 is shown generating a pulsed light output 53 to illuminate at least one illumination surface 25 along the bimorphic photomechanical cantilevered beam 88. The bimorphic photomechanical cantilevered beam 88 is adapted to move bimorphically in response to illumination of the illumination surfaces 25 by the pulsed light output 53. As the repetition frequency of the pulsed light output 53 is tuned to the proper frequency, the bimorphic photomechanical cantilevered beam 88 reciprocally deforms in a vibration tuned to a harmonic of the resonance chamber 85. These harmonic oscillations produce pressure waves within the fluidic pump chamber 82 sufficient to draw fluid 81 from the fluid inlet port into the fluidic pump chamber 82 and then to force fluid 81 from the fluidic pump chamber 82 into the fluid outlet port 84.

In alternate embodiments of the photomechanical fluidic pumps 80 shown in FIGS. 8 and 9, the light source 40 comprises a laser 41, specifically an Ar-ion laser adapted to generate said pulsed light output 53. A fiber optic cable 45 is adapted to direct the light output 50 from a light generation device 41 to said illumination surface 25 of the bimorphic photomechanical body 24. An optical system 47 focuses the light output 50. In variations of these embodiments, the bimorphic photomechanical bodies 24 have a plurality of illumination surfaces 25, and the light transfer devices 44 further comprising optic fiber splitters 46 adapted to split light output 50 so as to selectively illuminate the individual illumination surfaces 25. Tunable lasers 41 can be used to vary the pulse repetition pattern, pulse duration, and pulse amplitude so as to control the deformation shape and deformation frequency of either the bimorphic photomechanical cantilevered beam 88 or the bimorphic photomechanical sheet 89, depending on the type of fluidic pump 80. Where the fluid 81 does not significantly absorb or scatter the light output 50, a coherent beam 52 of pulsed light output 53 may be transmitted through the fluid 81 to the bimorphic photomechanical cantilevered beam 88 or the bimorphic photomechanical sheet 89. Otherwise, fiber optic cable can be laid atop the bimorphic photomechanical cantilevered beam 88 (as shown in FIG. 9) or the bimorphic photomechanical sheet 89 so as to directly illuminate the desired illumination surfaces 25.

Figure 10A:
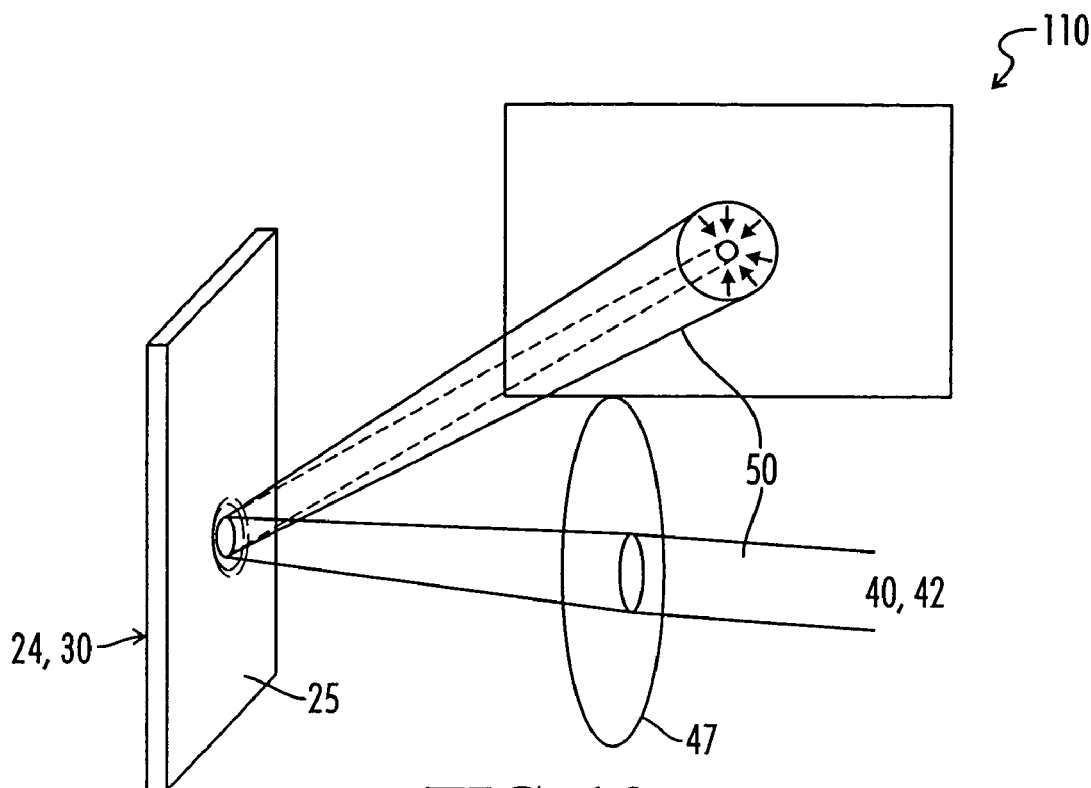
FIGS. 10a and 10b are schematic representations of bimorphic polymeric photomechanical actuator in a self-acting light beam focusing/defocusing apparatus.
Figure 10B:
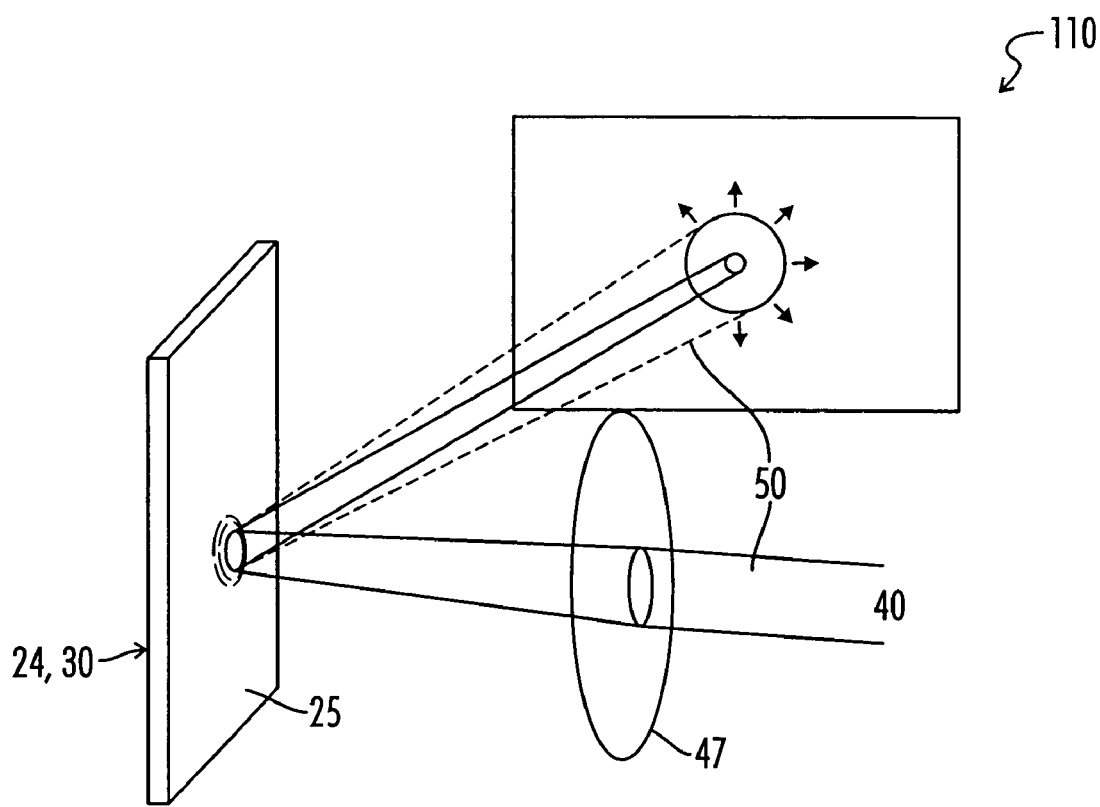

Referring to FIGS. 10a and 10b, an embodiment of the present invention comprising a light beam focusing apparatus 110 is shown. In these embodiments the light beam focusing apparatus 110 is a self-actuating light beam focusing apparatus 110. The apparatus is self-actuating in that the light beam being focused or defocused by the apparatus causes the apparatus to deform and change the focal qualities of the apparatus. The light beam has a divergence parameter which is a measure of the change in the cross-sectional area of the light beam as it travels along a beam path. Where the light beam's cross-sectional area is reduced as it travels along its beam path, the divergence parameter is negative and the beam is said to be focused toward a focal point. Where the light beam's cross-sectional area is increased as it travels along its beam path, the divergence parameter is positive and the beam is said to be defocused from an apparent focal point.

The self-actuating light beam focusing apparatus 110 includes a bimorphic photomechanical body 24 having an illumination surface 25. The bimorphic photomechanical body 24 is formed from a photomechanical polymeric material 30. The light output 50 is shaped by the optic system 47. The illumination surface 25 in this embodiment is flat (planar) while in the normal state and has a mirrored surface that reflects a large portion of any illuminating light. A light source 40 generates a light output 50 to illuminate the illumination surface 25 and causes the photomechanical body 24 to bimorphically deform itself into a mirrored lens.

Referring to FIG. 10a, this embodiment of the self-actuating light beam focusing apparatus 110 is adapted to focus the light beam output 50 when the photomechanical body 24 is illuminated. The illumination surface 25 bimorphically deforms to form a concave, reflective surface relative to the illuminating light beam output 50. The resulting concave mirror tends to shift the divergence parameter of the illuminating light beam output 50 in a negative direction by an amount corresponding to the shape of the mirror. In the embodiment as shown in FIG. 10a, the cross-sectional area of the reflected light beam (shown in broken lines) is reduced as the reflected light beam is focused toward a focal point. Referring to FIG. 10b, this embodiment of the self-acting light beam focusing/defocusing apparatus 110 is configured to defocus (or difuse) the light beam output 50 when the photomechanical body 24 is illuminated. The illumination surface 25 bimorphically deforms to form a convex reflective surface relative to the illuminating light beam output 50. The resulting convex mirror tends to shift the divergence parameter of the illuminating light beam output 50 in a positive direction by an amount corresponding to the shape of the mirror. In the embodiment as shown in FIG. 10b, the cross-sectional area of the reflected light beam (shown in broken lines) is increased as the beam diverges away from an apparent focal point. In a preferred embodiment, the light source 40 comprises a laser 42, and more particularly an Ar-ion laser 43. The applications of this embodiment of the invention include long distance open air light transmission lines (focusing) and protection of sensitive photodetectors against intensive laser radiation (defocusing).

Other similar embodiments of the light beam focusing apparatus 110 of this invention include embodiments where the photomechanical body 24 and its illumination surface 25 is either convex or concave in the normal, non-illuminated state. Still other embodiments are not self-actuating and include two or more light beams. In these embodiments, a light beam output 50 used to activate and shape the bimorphic deformation of the illumination surface 25. The deformed illumination surface 25 is then used to focus or defocus a second light beam. The second light beam would be of a frequency not causing a photomechanical effect in the photomechanical material selected to comprise the illumination surface 25. The photomechanical body of yet additional embodiments would transmit rather than reflect a large portion of the light beam output 50. In such embodiments, the convex illumination surfaces 25 would tend to focus the light beam output 50 while the concave illumination surfaces 25 would tend to defocus the light beam output 50.

Further advantages of the present invention include:

(a) The photomechanical actuator 70 generates greater mechanical displacement with greater energy conversion efficiency than the prior art actuators;

(b) Activating light in the visible and infrared spectrum can be delivered to the bimorphic photomechanical body 24 through conventional communication optic fibers without significant power losses;

(c) The polymeric photomechanical material 30 can be easily processed and shaped using a variety of techniques such as molding, stamping, bending, and cutting;

(d) The polymeric photomechanical material 30 is suitable for thin film technologies such as spin casting, spraying, dipping, vapor deposition, contact printing, and photolithography, thus making it possible to integrate the photomechanical actuator 70 into micro-electro-mechanical or micro-electro-opto-mechanical systems (MEMS/MEOMS);

(e) The photomechanical fluidic pumps 80 of this invention are light driven and do not require electrical power or electrical contacts, thus making it advantageous to integrate the photomechanical fluidic pumps 80 into micro-electro-mechanical or micro-electro-opto-mechanical systems (MEMS/MEOMS) such as MEMS fuel cells;

(f) A variety of trajectories of mechanical motion of the photomechanical actuator 70 can be achieved without changing an embodiment by simply changing the characteristics of the pulsed light output 53, such as pulse intensity, duration, repetition pattern, time delay between pulses, or by refocusing the pulsed light output 53 on different illumination surfaces 25 of the bimorphic photomechanical body 24;

(g) Photomechanical bodies are comprised of impact and stress resistant polymeric photomechanical materials 30; and (h) The photonic switch 100 of this invention is driven by the same optical signal as those being switched and does not require conversion into electric signal at any stage, thus making it advantageous to integrate the photonic switch 100 into photonic communication circuits with the highest up-today data flow rates.

Uses of the present invention include: light-driven micro-electro-mechanical systems (MEMS) and micro-electro-opto-mechanical systems (MEOMS); smart materials or skins; and photonic switches based on photo-driven deflectors.

Thus, although there have been described particular embodiments of the present invention of a new and useful "Bimorphic Polymeric Photomechanical Actuator," it is not intended that such references be construed as limitations upon the scope of this invention except as set forth in the following claims.

What is claimed is:

1. A bimorphic polymeric photomechanical body comprising:
    a layer of non-isotropic polymeric photomechanical material.

2. A photomechanical body comprising:
    a first layer of a first polymeric photomechanical material; and
    a second layer of a second polymeric photomechanical material, said second layer of a second polymeric photomechanical material affixed to said first layer of said first polymeric photomechanical material, each said polymeric photomechanical material adapted such that illumination of said polymeric photomechanical material by an applied field of selected light energy induces a photomechanical effect producing a bulk dimensional change,
    wherein, illumination of said first polymeric photomechanical material by an applied field of selected light energy causes a bimorphic deformation of said photomechanical body.

3. A photomechanical apparatus comprising:
    a photomechanical body, said photomechanical body comprising a polymeric photomechanical material, said polymeric photomechanical material adapted such that illumination of said polymeric photomechanical material by an applied field of selected light energy induces a photomechanical effect producing a bulk dimensional change proportional to an intrinsic property of said polymeric photomechanical material, and
    wherein, said intrinsic property varies along a gradient within said polymeric photomechanical material such that said bulk dimensional change comprises a bimorphic deformation of said photomechanical body.

4. The apparatus of claim 3, wherein said bulk dimensional change is proportional to a parametric value of said intrinsic property.

5. The apparatus of claim 4, wherein said parametric value is the thermal coefficient of linear expansion of the polymeric photomechanical material.

6. The apparatus of claim 4, wherein said photomechanical body comprises an elongated plate, said elongated plate comprising a first plate layer of a first polymeric photomechanical material and a second plate layer of a second polymeric photomechanical material,
wherein, said first plate layer is affixed upon said second plate layer,
wherein, said first polymeric photomechanical material comprising said first plate layer has a first plate layer average parametric value of said intrinsic property along said gradient and said polymeric photomechanical material comprising said second plate layer has a second plate layer average parametric value of said intrinsic property along said gradient, and
wherein, said first plate layer average parametric value is greater than said second plate layer average parametric value.

7. The apparatus of claim 3, wherein said applied field of selected light energy comprises an applied spectrum of light energy selected from the visible and infrared light spectrum.

8. The apparatus of claim 7, wherein said applied spectrum of light energy comprises a discrete spectrum of light energy selected from the visible and infrared light spectrum.

9. The apparatus of claim 7, wherein said applied spectrum of light energy comprises a continuous spectrum of light energy selected from the visible and infrared light spectrum.

10. The apparatus of claim 3, wherein said applied field of selected light energy comprises an applied spectrum of light energy selected from the light spectrum between 300 nm and 10000 nm.

11. The apparatus of claim 3, wherein said photomechanical polymeric material comprises a photosensitive polyvinylidene fluoride.

12. The apparatus of claim 11, wherein said photosensitive polyvinylidene fluoride comprises a bimorphic polyvinylidene fluoride film.

13. The apparatus of claim 12, wherein said bimorphic polyvinylidene fluoride film comprises a polyvinylidene fluoride film coated with a light absorbing material.

14. The apparatus of claim 3, wherein said photomechanical polymeric material comprises a photosensitive mylar.

15. The apparatus of claim 3, wherein said photomechanical body comprises a structure formed from said polymeric photomechanical material, said structure selected from the group comprising an elongated plate, a thin sheet, a fiber, and a wound strand.

16. The apparatus of claim 3, wherein said photomechanical effect produces an elastic bulk dimensional change within said polymeric photomechanical material and
wherein, cyclic illumination of said polymeric photomechanical material by said applied field of selected light energy causes reciprocating bimorphic deformation of said photomechanical body.

17. An photomechanical apparatus comprising:
a base;
a polymeric photomechanical body, said polymeric photomechanical body affixed to said base;
a light source, and
wherein, illumination of said polymeric photomechanical body by said light source causes a bimorphic deformation of said photomechanical body.

18. The apparatus of claim 17, wherein said polymeric photomechanical body comprises an illumination surface, said illumination surface comprising a polymeric photosensitive material,
wherein said light source is adapted to generate an illuminating field of selected light energy, and said light source is disposed so as to selectably illuminate said illumination surface, and
wherein, said polymeric photosensitive material has an intrinsic property, said intrinsic property having a parametric value, said polymeric photosensitive material adapted such that illumination of said polymeric photosensitive material by a field of selected light energy induces an elastic bulk dimensional change proportional to said parametric value, said parametric value varying along a gradient within said polymeric photosensitive, material such that said bulk dimensional change comprises a bimorphic deformation of said photomechanical body.

19. The apparatus of claim 18, wherein said parametric value is the thermal coefficient of linear expansion of said polymeric photosensitive material.

20. The apparatus of claim 18, wherein said applied field of selected light energy comprises an applied spectrum of light energy selected from the visible and infrared light spectrum.

21. The apparatus of claim 20, wherein said applied spectrum of light energy comprises a discrete spectrum of light energy selected from the visible and infrared light spectrum.

22. The apparatus of claim 21, wherein said applied spectrum of light energy comprises a continuous spectrum of light energy selected from the visible and infrared light spectrum.

23. The apparatus of claim 20, said applied field of selected light energy comprises an applied spectrum of light energy selected from the light spectrum between 300 nm and 10000 nm.

24. The apparatus of claim 18, wherein said polymeric photosensitive material comprises a photosensitive polyvinylidene fluoride.

25. The apparatus of claim 24, wherein said photosensitive polyvinylidene fluoride comprises a bimorphic polyvinylidene fluoride film.

26. The apparatus of claim 24, wherein said bimorphic polyvinylidene fluoride film comprises a polyvinylidene fluoride film coated with a light absorbing material.

27. The apparatus of claim 18, wherein said photomechanical body comprises a structure formed from said polymeric photosensitive material, said structure selected from the group comprising an elongated plate, a thin sheet, a fiber, and a wound strand.

28. The apparatus of claim 18, wherein said photomechanical body comprises an elongated plate, said elongated plate comprising a first plate layer of polymeric photosensitive material and a second plate layer of polymeric photomechanical material, each said first and second plate layer having major opposing surfaces,
wherein, one major surface of said first plate layer is affixed upon one major surface of said second plate layer,
wherein, said polymeric photosensitive material comprising said first plate layer has a first plate layer average parametric value of said intrinsic property along said gradient and said polymeric photosensitive material comprising said second plate layer has a second plate layer average parametric value of said intrinsic property along said gradient, and wherein, said first plate layer average parametric value is greater than said second plate layer average parametric value.

29. The apparatus of claim 18, said light source further adapted to cyclically generate an illuminating field of selected light energy, and wherein, said photomechanical body is adapted for reciprocating, bimorphic deformation in response to said cyclic illumination of said illumination surface by said applied field of selected light energy.

30. A photomechanical actuator, said actuator comprising:
a bimorphic photomechanical body having an illumination surface, said bimorphic photomechanical body comprising at least one photomechanical polymeric material, said bimorphic photomechanical body further comprising an actuator output element;
a light source adapted to generate a light output, said light source disposed so as to illuminate said illumination surface with said light output; and
an actuator receiving element, said actuator receiving element adapted to receive the actuator output element,
wherein, said bimorphic photomechanical body is adapted to move said actuator output element by bimorphically deforming in response to illumination of said illumination surface by said light output, and
wherein, said actuator receiving element is adapted so as to transfer the motion of said actuator output element to the actuator receiving element.

31. The apparatus of claim 30, said light source comprising a laser.

32. The apparatus of claim 31, said laser generating a light output in the visible or infrared spectrum.

33. The apparatus of claim 31, said laser generating a light output in the spectrum between 300 nm and 10000 nm and said laser selected from a group of lasers comprising: Ar-ion laser; Nd: YAG lasers; Ti: sapphire lasers; tunable solid state and dye lasers; semiconductor lasers; and carbon dioxide lasers.

34. The apparatus of claim 31, said laser comprising an Ar-ion laser.

35. The apparatus of claim 30, the light source comprising:
a light generation device adapted to generate a pulsed light output; and
a light transfer device adapted to direct said light output from said light generation device to said illumination surface.

36. The apparatus of claim 35, said light transfer device comprising a fiber optic cable.

37. The apparatus of claim 36, said bimorphic photomechanical body having a plurality of illumination surfaces, said light transfer device further comprising an optic fiber splitter adapted to split said light output transferred from said light source for transfer to said plurality of illumination surfaces.

38. The apparatus of claim 30, said light source comprising a light shaping optical device adapted to focus said light output.

39. The apparatus of claim 38, said light shaping optical device comprising an optical lens.

40. A photomechanical actuator, said actuator comprising:
a base;
a bimorphic photomechanical plate affixed to said base, said bimorphic photomechanical plate having at least one illumination surface, said bimorphic photomechanical plate comprising a non-isotropic polymeric photomechanical material;
an actuator output element;
an actuator receiving element;
a light source adapted to generate a pulsed light output, said light source disposed so as to illuminate each said illumination Surface with at least a portion of said light output; and
wherein, said bimorphic photomechanical plate is adapted to move said actuator output element by bimorphic deformation in response to illumination of each said illumination surface by said light output, and
wherein, said actuator receiving element is adapted so as to transfer the motion of said actuator output element to the actuator receiving element.

41. The apparatus of claim 40, the light source comprising:
a laser adapted to generate said pulsed light output;
a fiber optic cable adapted to direct said pulsed light output from said laser to at least one said illumination surface; and
an optical system adapted to shape said pulsed light output.

42. The apparatus of claim 41, said bimorphic photomechanical plate having a plurality of illumination surfaces, said light source further comprising an optic fiber splitter adapted to split said light output transferred from said laser for transfer to said plurality of illumination surfaces.

43. The apparatus of claim 41, said pulsed light output having a pulse repetition pattern, said laser adapted to adjustably generate said pulsed light output so as to vary the pulse repetition pattern.

44. The apparatus of claim 41, said pulsed light output having a pulse duration, said laser adapted to adjustably generate said pulsed light output so as to vary the pulse duration.

45. The apparatus of claim 41, said pulsed light output having a pulse amplitude, said laser adapted to adjustably generate said pulsed light output so as to vary the pulse amplitude.

46. The apparatus of claim 41, said laser adapted to adjustably generate said pulsed light output so as to vary the time delay between pulses in different light outputs.

47. The apparatus of claim 41, said laser generating a light output in the visible or infrared spectrum.

48. The apparatus of claim 41, said laser generating a light output in the spectrum between 300 nm and 10000 nm and said laser selected from a group of lasers comprising: Ar-ion laser; Nd: YAG lasers; Ti: sapphire lasers; tunable solid state and dye lasers; semiconductor lasers; and carbon dioxide lasers.

49. The apparatus of claim 41, said laser comprising an Ar-ion laser.

50. A photomechanical fluidic pump, said fluidic pump comprising:
a fluidic pump chamber for receiving a fluid, said fluidic pump chamber having a fluid inlet port and a fluid outlet port, sail fluidic pump chamber adapted to allow said fluid to flow from said fluid inlet port through said fluidic pump chamber and into said fluid outlet port;
a fluidic actuator disposed within said fluidic pump chamber, said fluidic actuator comprising a bimorphic photomechanical body, said bimorphic photomechanical body having an illumination surface, said bimorphic photomechanical body comprising a non-isotropic photomechanical polymeric material;

a light source adapted to generate a pulsed light output, said light source disposed so as to illuminate said illumination surface with a portion of said light output; and wherein, said fluidic actuator is adapted to move bimorphically in response to illumination of said illumination surface by said light output, and wherein, said fluidic actuator is adapted so as to transfer the motion of said fluidic actuator to said fluid.

51. The apparatus of claim 50, photomechanical fluidic pump further comprising a cantilevered beam-resonance chamber fluidic pump, wherein said fluidic pump chamber further comprises a resonance chamber, wherein said fluidic actuator further comprises a bimorphic photomechanical cantilevered beam disposed in said resonance chamber.

52. The apparatus of claim 50, photomechanical fluidic pump further comprising a fluidic diaphragm pump, wherein said fluidic actuator further comprises a bimorphic photomechanical sheet disposed in said fluidic pump chamber.

53. The apparatus of claim 50, the light source comprising:
a laser adapted to generate said pulsed light output;
a fiber optic cable adapted to direct said pulsed light output from said light generation device to said illumination surface;
an optical system adapted to shape said pulsed light output into a coherent beam.

54. The apparatus of claim 53, said bimorphic photomechanical body having a plurality of illumination surfaces, said light source further comprising an optic fiber splitter adapted to split said light output transferred from said laser for transfer to said plurality of illumination surfaces.

55. The apparatus of claim 53, said pulsed light output having a pulse repetition pattern, said laser adapted to adjustably generate said pulsed light output so as to vary the pulse repetition pattern.

56. The apparatus of claim 53, said pulsed light output having a pulse duration, said laser adapted to adjustably generate said pulsed light output so as to vary the pulse duration.

57. The apparatus of claim 53, said pulsed light output having a pulse amplitude, said laser adapted to adjustably generate said pulsed light output so as to vary the pulse amplitude.

58. The apparatus of claim 53, said laser adapted to adjustably generate said pulsed light output so as to vary the time delay between pulses in different light outputs.

59. The apparatus of claim 53, said laser comprising an Ar-ion laser.

60. A photomechanical actuator, said actuator comprising:
a base;
a bimorphic photomechanical assembly, said bimorphic photomechanical assembly affixed to said base, said bimorphic photomechanical assembly comprising a plurality of bimorphic photomechanical bodies, each said bimorphic photomechanical body comprising a non-isotropic photomechanical polymeric material;
a light source adapted to generate a pulsed light output, said light source disposed so as to illuminate each said non-isotropic photomechanical polymeric material with at least a portion of said light output, said light source adapted so as to selectably illuminate each said non-isotropic photomechanical polymeric material with at least a portion of said light output; and
an actuator output element, said actuator output element affixed to said bimorphic photomechanical assembly; and
wherein, each said bimorphic photomechanical body is adapted to move in response to said selectable illumination by said light output.

61. The apparatus of claim 60, the light source comprising:
a laser adapted to generate said pulsed light output;
a fiber optic cable adapted to direct said light output from said light generation device to each said non-isotropic photomechanical polymeric material; and
an optical system adapted to shape said light output into a coherent beam;
an optic fiber splitter adapted to split said light output transferred from a light source for transfer to each said non-isotropic photomechanical polymeric material.

62. The apparatus of claim 61, said laser adapted to adjustably generate said pulsed light output, said pulsed light output having a pulse repetition pattern, a pulse duration, and a pulse amplitude.

63. The apparatus of claim 62, said laser adapted to adjustably generate said pulsed light output so as to vary the pulse repetition pattern.

64. The apparatus of claim 62, said laser adapted to adjustably generate said pulsed light output so as to vary the pulse duration.

65. The apparatus of claim 62, said laser adapted to adjustably generate said pulsed light output so as to vary the pulse amplitude.

66. The apparatus of claim 62, said laser adapted to adjustably generate said pulsed light output so as to vary the time delay between pulses in different light outputs.

67. The apparatus of claim 62, said laser comprising an Ar-ion laser.

68. A photokinetic apparatus for positioning an executing element, the apparatus comprising:
a light source adapted to generate a light output;
a bimorphic polyvinylidene fluoride film exposed to said light output and adapted to move an actuator output arm in response to said light output; and
said actuator output arm connected to said film and adapted to transfer the movement of the output arm to said executing element.

69. A photomechanical electronic switch, said photomechanical electronic switch comprising:
an electronic switch disposed in an electrical circuit;
a bimorphic photomechanical body, said bimorphic photomechanical body adapted to operate said electronic switch; and
a light source disposed so as to illuminate said bimorphic photomechanical body; and
wherein, illumination of said bimorphic photomechanical body causes a bimorphic deformation of said photomechanical body sufficient to operate said electronic switch.

70. A photomechanical electronic switch, said photomechanical electronic switch comprising:
a bimorphic photomechanical body comprising a non-isotropic photomechanical polymeric material;
a light source adapted to generate a light output, said light source disposed so as to illuminate said non-isotropic photomechanical polymeric material with said light output; and an electronic switch disposed in an electrical circuit, said electronic switch comprising:
  a switch contact, said switch contact affixed to said bimorphic photomechanical body; and
  a circuit contact, said circuit contact adapted to receive said switch contact so as to provide electrical communication across said electronic switch,
wherein, said electronic switch is movably adjustable between an open configuration and a closed configuration, said open configuration corresponding to said switch contact disposed so as to interrupt said electrical communication across said electronic switch, and said closed configuration corresponding to said switch contact disposed so as to provide said electrical communication across said electronic switch,
wherein, illumination of said non-isotropic photomechanical polymeric material causes a bimorphic deformation of said photomechanical body sufficient to move said electronic switch from the open configuration to the closed configuration or from the closed configuration to the open configuration.

71. The apparatus of claim 70, said light source comprising a laser.

72. The apparatus of claim 71, said laser comprising an Ar-ion laser.

73. The apparatus of claim 70, the light source comprising a light transfer device adapted to direct said light output from said a light generation device to said non-isotropic photomechanical polymeric material.

74. The apparatus of claim 73, said light transfer device comprising a fiber optic cable.

75. The apparatus of claim 73, said light transfer device comprising an optical system adapted to shape said light output into a coherent beam.

76. The apparatus of claim 70, said light source comprising a light shaping optical device adapted to focus said light output.

77. The apparatus of claim 76, said light shaping optical device comprising an optical lens.

78. A photonic switch, said photomechanical photonic switch comprising:
  a bimorphic photomechanical body comprising a non-isotropic photomechanical polymeric material;
  a light source adapted to generate a light output, said light source disposed so as to illuminate said non-isotropic photomechanical polymeric material with said light output; and
  a photonic switch disposed in an optical circuit, said photonic switch comprising
    a light transmitter adapted to generate a signal light beam;
    a reflector affixed to said bimorphic photomechanical body, said reflector adapted to reflect said signal light beam; and
    a light receiver, said receiver adapted to receive said reflected signal light beam so as to provide optical communication across said photonic switch,
wherein, said photonic switch is movably adjustable between an open configuration and a closed configuration, said open configuration corresponding to said reflector disposed so as to interrupt said optical communication across said photonic switch, and said closed configuration corresponding to said reflector disposed so as to provide said optical communication across said photonic switch,
wherein, illumination of said non-isotropic photomechanical polymeric material causes a bimorphic deformation of said photomechanical body sufficient to move said photonic switch from the open configuration to the closed configuration or from the closed configuration to the open configuration.

79. The apparatus of claim 78, said light source comprising a fiber optic transmitter.

80. The apparatus of claim 79, said fiber optic transmitter comprising an infrared semiconductor laser.

81. A light beam focusing apparatus, said light beam focusing apparatus comprising:
  a bimorphic photomechanical body having an illumination surface, said bimorphic photomechanical body comprising a photomechanical polymeric material;
  a light source adapted to generate a light output beam, said light output beam following a beam path, said light source disposed so as to illuminate said illumination surface with said light output beam, said light output beam having a beam cross-sectional area and a beam divergence parameter corresponding to the change in said beam cross-sectional area along said beam path;
  wherein, when said illumination surface is not being illuminated, said bimorphic photomechanical body has a flat shape and reflects said light output as a flat mirror without changing the beam divergence parameter of said beam;
  wherein, illumination of said illumination surface by said an applied field of selected light energy causes a bimorphic deformation of said photomechanical body sufficient to change said beam divergence parameter of said output beam.

82. The apparatus of claim 81, said light source comprising a laser.

83. The apparatus of claim 82, said laser adapted to operate in a spectrum between 300 nm and 10000 nm.

* * * * *